United States Patent
Kwon et al.

(10) Patent No.: US 9,685,657 B2
(45) Date of Patent: Jun. 20, 2017

(54) COMPOSITE PRECURSOR, COMPOSITE PREPARED THEREFROM, A METHOD OF PREPARING A COMPOSITE PRECURSOR AND A COMPOSITE, POSITIVE ELECTRODE FOR LITHIUM SECONDARY BATTERY INCLUDING THE SAME, AND LITHIUM SECONDARY BATTERY EMPLOYING THE SAME

(71) Applicant: SAMSUNG SDI CO., LTD., Yongin-si, Gyeonggi-do (KR)

(72) Inventors: Seon-Young Kwon, Yongin-si (KR); Do-Hyung Park, Yongin-si (KR); Min-Han Kim, Yongin-si (KR); Ji-Hyun Kim, Yongin-si (KR); Joong-Ho Moon, Yongin-si (KR); Kyoung-Hyun Kim, Yongin-si (KR); Han-Eol Park, Yongin-si (KR); Yong-Chan You, Yongin-si (KR); Chang-Wook Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 262 days.

(21) Appl. No.: 14/285,628

(22) Filed: May 22, 2014

(65) Prior Publication Data
US 2015/0044563 A1   Feb. 12, 2015

(30) Foreign Application Priority Data

Aug. 8, 2013   (KR) .......................... 10-2013-0094324

(51) Int. Cl.
| | | |
|---|---|---|
| *H01M 4/36* | (2006.01) | |
| *H01M 4/505* | (2010.01) | |
| *H01M 4/525* | (2010.01) | |
| *C01G 45/02* | (2006.01) | |
| *C01G 45/12* | (2006.01) | |
| *C01G 53/00* | (2006.01) | |
| *H01M 4/485* | (2010.01) | |
| *H01M 10/052* | (2010.01) | |

(52) U.S. Cl.
CPC .............. *H01M 4/36* (2013.01); *C01G 45/02* (2013.01); *C01G 45/1257* (2013.01); *C01G 53/006* (2013.01); *C01G 53/50* (2013.01); *H01M 4/505* (2013.01); *H01M 4/525* (2013.01); *C01P 2002/72* (2013.01); *C01P 2002/88* (2013.01); *C01P 2004/03* (2013.01); *C01P 2004/04* (2013.01); *C01P 2004/82* (2013.01); *H01M 4/485* (2013.01); *H01M 10/052* (2013.01)

(58) Field of Classification Search
None
See application file for complete search history.

(56) References Cited

U.S. PATENT DOCUMENTS

| | | | | |
|---|---|---|---|---|
| 6,103,422 A | * | 8/2000 | Kanai | ................ C01G 45/1221 423/594.2 |
| 2009/0117469 A1 | * | 5/2009 | Hiratsuka | ............. H01M 4/366 429/231.8 |
| 2010/0316910 A1 | | 12/2010 | Kajiyama et al. | |
| 2011/0305954 A1 | | 12/2011 | Kim et al. | |
| 2013/0142944 A1 | | 6/2013 | Venkatachalam et al. | |
| 2015/0104644 A1 | * | 4/2015 | Iwata | ..................... C01G 45/00 428/402 |
| 2015/0140429 A1 | | 5/2015 | Kawakami et al. | |
| 2016/0016815 A1 | * | 1/2016 | Ou | ....................... C01G 53/006 423/594.3 |

FOREIGN PATENT DOCUMENTS

| | | |
|---|---|---|
| JP | 2012-505520 A | 3/2012 |
| JP | 2013-93319 A | 5/2013 |
| KR | 10-2007-0018303 A | 2/2007 |
| KR | 10-2010-0093034 A | 8/2010 |
| KR | 10-2011-0044375 A | 4/2011 |
| KR | 10-2011-0136002 A | 12/2011 |

OTHER PUBLICATIONS

KIPO Office Action dated Jan. 18, 2017, for corresponding Korean Patent Application No. 10-2013-0094324 (6 pages).

* cited by examiner

*Primary Examiner* — Jeremiah Smith
(74) *Attorney, Agent, or Firm* — Lewis Roca Rothgerber Christie LLP

(57) ABSTRACT

A composite precursor represented by Formula 1, a composite prepared therefrom represented by Formula 2, a method of preparing a composite precursor and a composite, a positive electrode for lithium secondary battery including the same, and a lithium secondary battery employing the same.

$$aMn_3O_4 \cdot bM(OH)_2 \quad \text{Formula 1}$$

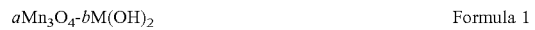

wherein in Formula 1, $0 < a \le 0.8$, $0.2 \le b < 1$
and M is at least one metal selected from the group consisting of titanium (Ti), vanadium (V), chromium (Cr), manganese (Mn), iron, (Fe), cobalt (Co), nickel (Ni), copper (Cu), aluminum (Al), magnesium (Mg), zirconium (Zr), and boron (B)

$$aLi_2MnO_3 \cdot bLi_yMO_2 \quad \text{Formula 2}$$

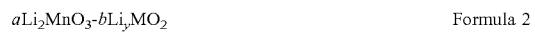

wherein in Formula 2, $0 \le a \le 0.6$, $0.4 \le b \le 1$
$1.0 \le y \le 1.05$,
and M is at least one metal selected from the group consisting of Ti, V, Cr, Mn, Fe, Co, Ni, Cu, Al, Mg, Zr, and B.

3 Claims, 7 Drawing Sheets

COMPOSITE PRECURSOR, COMPOSITE PREPARED THEREFROM, A METHOD OF PREPARING A COMPOSITE PRECURSOR AND A COMPOSITE, POSITIVE ELECTRODE FOR LITHIUM SECONDARY BATTERY INCLUDING THE SAME, AND LITHIUM SECONDARY BATTERY EMPLOYING THE SAME

CROSS-REFERENCE TO RELATED APPLICATION

This application claims priority to and the benefit of Korean Patent Application No. 10-2013-0094324, filed on Aug. 8, 2013, in the Korean Intellectual Property Office, the disclosure of which is incorporated herein in its entirety by reference.

BACKGROUND

1. Field

One or more embodiments of the present invention relate to a composite precursor, a composite prepared therefrom, a method of preparing a composite precursor and a composite, a positive electrode for lithium secondary battery including the same, and a lithium secondary battery employing the same.

2. Description of the Related Art

Application of lithium secondary batteries to mobile phones, camcorders, and laptop computers is drastically increasing. The factor determining capacity of the batteries is a positive electrode active material. Electrochemical properties of the positive active material determine whether a battery may be used for a long period of time at a high rate or whether the initial battery capacity may be maintained after a charge and discharge cycle.

Lithium cobalt oxide and lithium nickel composite oxide are widely used as a positive electrode active material for lithium secondary batteries.

A transition metal is sometimes added to the lithium nickel composite oxide to improve stability and cyclic properties.

However, the lithium nickel composite oxide which is currently available has much room for improvement because the electrode density and the capacity are not provided at satisfactory levels.

SUMMARY

One or more embodiments of the present invention include a composite precursor, a composite prepared therefrom, a method of preparing a composite precursor and a composite, a positive electrode for lithium secondary battery including the same, and a lithium secondary battery employing the same.

One embodiment of the present invention includes a composite precursor represented by Formula 1 below.

$$aMn_3O_4\text{-}bM(OH)_2 \qquad \text{Formula 1}$$

In Formula 1, $0<a\leq0.8$, $0.2\leq b<1$, and M is at least one metal selected from the group consisting of titanium (Ti), vanadium (V), chromium (Cr), manganese (Mn), iron, (Fe), cobalt (Co), nickel (Ni), copper (Cu), aluminum (Al), magnesium (Mg), zirconium (Zr), and boron (B).

Another embodiment of the present invention includes a composite represented by Formula 2 below.

$$aLi_2MnO_3\text{-}bLi_yMO_2 \qquad \text{Formula 2}$$

In Formula 2, $0\leq a\leq0.6$, $0.4\leq b\leq1$, $1.0\leq y\leq1.05$, and M is at least one metal selected from the group consisting of Ti, V, Cr, Mn, Fe, Co, Ni, Cu, Al, Mg, Zr, and B.

Another embodiment of the present invention includes a method of preparing a composite represented by Formula 2, wherein the composite represented by Formula 2 is prepared by mixing the composite precursor of Formula 1 and a lithium compound, and then heat-treating the mixture.

Another embodiment of the present invention includes a positive electrode for lithium secondary battery including the composite. Another embodiment of the present invention includes a lithium secondary battery employing a positive electrode for the lithium secondary battery according to embodiments of the present invention; a negative electrode; and a separator interposed between the positive electrode and the negative electrode.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
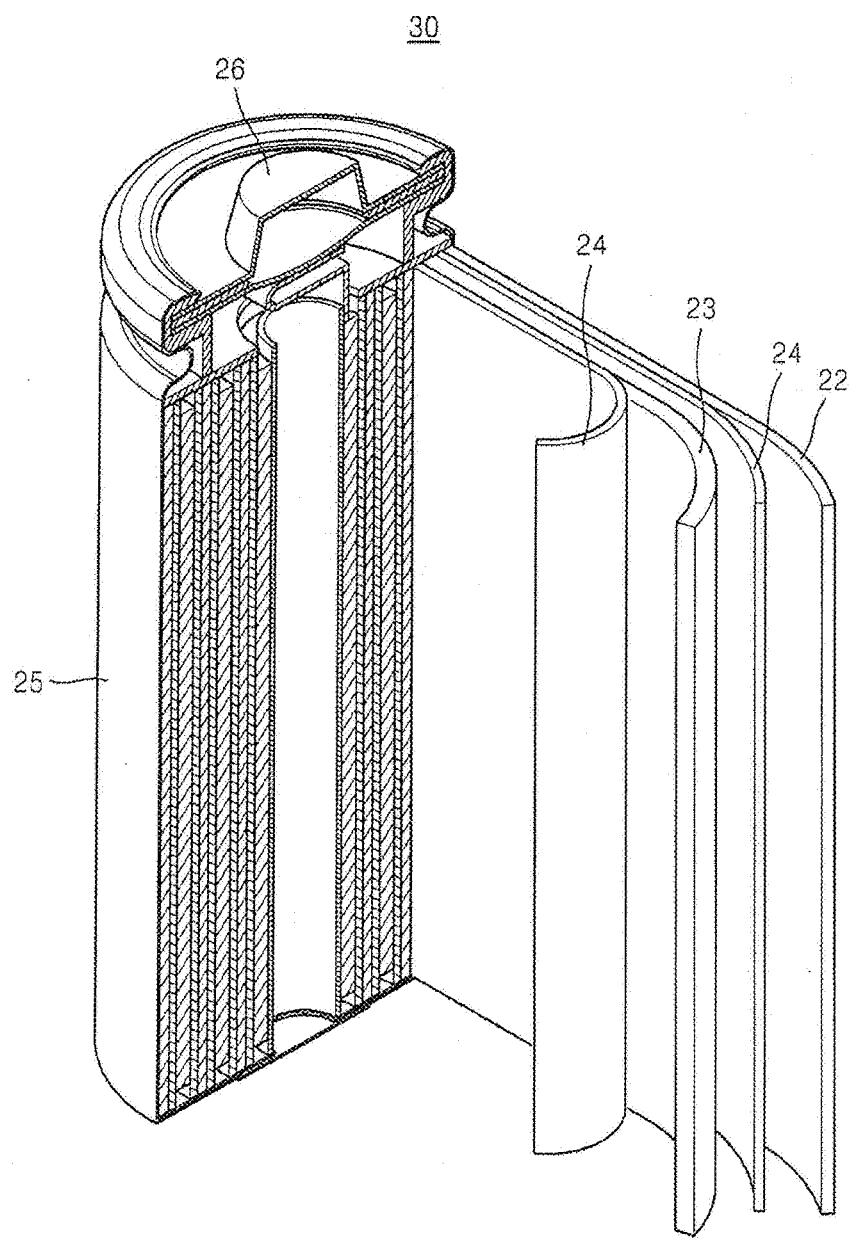
FIG. 1 shows a schematic diagram of a lithium secondary battery according to one embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Further, the use of "may" when describing embodiments of the present invention refers to "one or more embodiments of the present invention."

One embodiment of the present invention includes a composite precursor represented by Formula 1 below.

$$aMn_3O_4\text{-}bM(OH)_2 \qquad \text{Formula 1}$$

wherein in Formula 1, $0<a\leq 8$, $0.2\leq b<1$, and M is at least one metal selected from the group consisting of titanium (Ti), vanadium (V), chromium (Cr), manganese (Mn), iron, (Fe), cobalt (Co), nickel (Ni), copper (Cu), aluminum (Al), magnesium (Mg), zirconium (Zr), and boron (B).

In Formula 1, according to some embodiments, M includes Ni, Mn, and Co, and x is from about 0.05 to about 0.5.

In some embodiments, the composite precursor of Formula 1 is a starting material from which a composite represented by Formula 2 below is formed. In the composite of Formula 2, cycle life property is improved as $Li_2MnO_3$ phase is formed uniformly.

$aLi_2MnO_3\text{-}bLi_yMO_2$                    Formula 2 wherein in Formula 2, $0\leq a\leq 0.6$, $0.4\leq b\leq 1$, $1.0\leq y\leq 1.05$, and M is at least one metal selected from the group consisting of Ti, V, Cr, Mn, Fe, Co, Ni, Cu, Al, Mg, Zr, and B.

In Formula 2, according to some embodiments, x is from about 0.45 to about 0.5.

In an X-ray diffraction spectrum using Cu—Kα, the composite of Formula 2 shows a singlet $Li_2MnO_3$ peak at 2θ in the range of 21±0.5°.

An analysis of the composite of Formula 2 by using a transmission electron microscope shows that the formation of the composite of Formula 2 is uniform in the internal region (face region) and the edge region (shell region). The result indicates that $Li_2MnO_3$ phase is formed uniformly over the entire composite region in the composite of Formula 2.

In some embodiments, the composite precursor represented by Formula 1 is, for example, $0.5Mn_3O_4$-$0.5Ni_{0.22}Co_{0.12}Mn_{0.66}(OH)_2$, $0.5Mn_3O_4$-$0.5Ni_{0.22}Co_{0.12}Mn_{0.51}(OH)_2$, $0.05Mn_3O_4$-$0.95Ni_{0.26}Co_{0.14}Mn_{0.6}(OH)_2$, $0.05Mn_3O_4$-$0.85Ni_{0.26}Co_{0.14}Mn_{0.6}(OH)_2$, $0.05Mn_3O_4$-$0.95Ni_{0.29}Co_{0.12}Mn_{0.59}(OH)_2$, $0.05Mn_3O_4$-$0.85Ni_{0.29}Co_{0.12}Mn_{0.59}(OH)_2$, $0.05Mn_3O_4$-$0.95Ni_{0.23}Co_{0.24}Mn_{0.53}(OH)_2$, or $0.05Mn_3O_4$-$0.85Ni_{0.23}Co_{0.24}Mn_{0.536}(OH)_2$.

In an X-ray diffraction spectrum using Cu—Kα, the composite precursor of Formula 1 shows a peak at 2θ in the range of 35±0.5°.

In Formula 2, according to some embodiments, M includes Ni, Mn, and Co.

In some embodiments, the composite represented by Formula 2 is $0.5Li_2MnO_3$-$0.5LiNi_{0.5}Co_{0.2}Mn_{0.3}$ or $0.45Li_2MnO_3$-$0.55LiNi_{0.5}Co_{0.2}Mn_{0.3}O_2$.

The following is a method of preparing the composite precursor represented by Formula 1, and a composite represented by Formula 2 using the composite precursor represented by Formula 1.

A composite represented by Formula 2 may be obtained by mixing a composite precursor of Formula 1 and a lithium compound at a predetermined molar ratio of the composite precursor and the lithium compound, and heat-treating the mixture.

The hydroxide/spinel ratio of the composite precursor is found by inductively coupled plasma spectrometry, and the molar ratio is calculated according to the hydroxide/spinel ratio before heat treatment.

The lithium compound may be lithium hydroxide, lithium fluoride, lithium carbonate or a mixture thereof. The content of the lithium compound is stoichiometrically controlled to obtain the composite composition of Formula 2.

The heat treatment is performed at about 700 to about 900° C. If the heat treatment is performed in this temperature range, a lithium composite oxide may be prepared easily.

The heat treatment may be performed in an oxidative gas atmosphere. The oxidative gas atmosphere may be prepared by using an oxidative gas such as oxygen or air. For example, the oxidative gas may include oxygen or air of about 10 to about 20 vol % and an inert gas of about 80 to about 90 vol %.

In some embodiments, the composite precursor represented by Formula 1 is obtained by mixing a metal (M) precursor and a solvent, and adding a chelating agent and a pH control agent to perform a coprecipitation reaction of the mixture.

A composite precursor represented by Formula 1 may be obtained by washing and drying the coprecipitation product, which was obtained by purging the product with nitrogen. In some embodiments, the product may be obtained without nitrogen purging.

The chelating agent may be ammonia or ammonia sulfate.

The pH control agent may be, for example, sodium hydroxide solution.

The metal (M) precursor may be, for example, a metal (M) sulfate, a metal (M) nitrate or a metal (M) chloride.

If the M includes nickel, cobalt, or manganese, an M precursor may be a nickel precursor, a cobalt precursor or a manganese precursor.

The nickel precursor may be nickel sulfate, nickel nitrate or nickel chloride, and the cobalt precursor may be cobalt sulfate, cobalt nitrate or cobalt chloride.

The manganese precursor may be manganese sulfate, manganese nitrate or manganese chloride.

The content of an M precursor is stoichiometrically controlled to obtain the composite precursor composition of Formula 1.

The solvent may be water. The content of the solvent may be in a range of about 100 to about 3000 parts by weight with reference to 100 parts by weight of an M precursor. If the content of the solvent is in the range, a mixture wherein each component is homogenously mixed may be obtained.

The pH control agent may be, for example, a sodium hydroxide solution.

In some embodiments, the pH of the resulting product is controlled to be in the range between about 11 to about 12.5, and in some embodiments, between about 11.5 to about 12.0, by controlling the content of the pH control agent.

The composite precursor of Formula 1, according to some embodiments, is obtained by obtaining a precipitate from the reaction of the mixture, washing the obtained precipitate with pure water, and drying the precipitate.

A composite represented by Formula 2 according to an embodiment of the present invention may be used as a positive electrode active material for a lithium secondary battery.

The composite may be used to prepare an electrode having improved density and capacity properties, and a lithium secondary battery having improved cycle life properties may be prepared by using such electrode.

The following is a procedure for preparing a lithium secondary battery, wherein the composite represented by Formula 2 is used as a positive electrode active material for the lithium secondary battery. A method of preparing a lithium secondary battery having a positive electrode, a negative electrode, a lithium salt-containing non-aqueous electrolyte, and a separator according to an embodiment of the present invention is described.

In some embodiments, a positive electrode and a negative electrode are prepared by respectively coating and drying a composition for the preparation of a positive electrode active material layer and a composition for the preparation of a negative electrode active material layer.

According to embodiments of the present invention, the composition for the preparation of a positive electrode active material layer is prepared by mixing a positive electrode active material, a conductive agent, a binder, and a solvent. Here, the positive electrode active material is a lithium composite oxide represented by Formula 2.

In some embodiments, the binder helps the binding of an electrode active material with a conductive agent and the binding of an electrode active material with a current collector, and the binder is added in a range of about 1 to about 50 parts by weight with reference to the total 100 parts by weight of a positive electrode active material. Non-limiting examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butylene rubber, fluoro rubber, and various copolymers. In some embodiments, the content of the binder is in a range of about 2 to about 5 parts by weight with reference to the total 100 parts by weight of a positive electrode active material. If the content of the binder is within the range, the binding force of an electrode active material to a current collector may be good.

The conductive agent is not limited to a specific substance as long as the substance is electrically conductive and does not cause any chemical change to the battery. Non-limiting examples of a conductive agent include graphite such as natural graphite or artificial graphite; a carbon substance such as carbon black, acetylene black, Ketjen black, furnace black, lamp black or thermal black; conductive fiber such as carbon fiber or metal fiber; fluorocarbon; a metallic power such as aluminum, or nickel power; a conductive whisker such as zinc oxide or potassium titanate; a conductive metal oxide such as titanium oxide; or a conductive material such as a polyphenylene derivative.

In some embodiments, the content of the conductive agent is in a range of about 2 to about 5 parts by weight with reference to the total 100 parts by weight of a positive electrode active material. If the content of the conductive agent is within the range, the electric conductivity of the finally obtained electrode may be excellent.

A non-limiting example of the solvent is N-methylpyrrolidone.

In some embodiments, the content of the solvent is in a range of about 1 to about 10 parts by weight with reference to the total 100 parts by weight of a positive electrode active material. If the content of the solvent is within the range, formation of an electrode active material may be conveniently performed.

The positive electrode current collector is not limited to a specific substance as long as the substance is about 3 to about 500 μm thick, highly conductive, and does not cause any chemical change to the battery. For example, a positive electrode current collector may be made of stainless steel, aluminum, nickel, titanium, heat-treated carbon; or aluminum or stainless steel wherein the surface is treated with carbon, nickel, titanium or silver, but the positive electrode current collector is not limited thereto. The positive electrode current collector may increase the adhesive strength of a positive electrode active material due to tiny bumps formed on the surface of the current collector, and may have various shapes such as film, sheet, foil, net, porous material, foam, or felt.

In some embodiments, a composition for the preparation of a negative electrode active material layer is prepared by mixing a negative electrode active material, a binder, a conductive agent, and a solvent.

The negative electrode active material, according to embodiments of the present invention, is a material enabling occlusion and emission of a lithium ion. Non-limiting examples of the negative electrode active material include carbon materials such as graphite and carbon, lithium metal or an alloy thereof, or a silicone oxide substance. Silicon oxide is used according to an embodiment of the present invention.

In some embodiments, the binder is added in a range of about 1 to about 50 parts by weight with reference to the total 100 parts by weight of a positive electrode active material. Non-limiting examples of the binder may be the same as described in connection with a positive electrode.

In some embodiments, the content of the conductive agent is in a range of about 1 to about 5 parts by weight with reference to the total 100 parts by weight of a negative electrode active material. If the content of the conductive agent is within the range, the electric conductivity of the finally obtained electrode may be excellent.

In some embodiments, the content of the solvent is in a range of about 1 to about 10 parts by weight with reference to the total 100 parts by weight of a negative electrode active material. If the content of the solvent is within the range, formation of a negative electrode active material layer may be conveniently performed.

The conductive agent and the solvent may be formed of the same substances used for the preparation of a positive electrode.

In the embodiments of the present invention, the negative electrode current collector is prepared to be about 3 to about 500 μm thick. The negative electrode current collector is not limited to a specific substance as long as the substance is conductive, and does not cause any chemical change to the battery. For example, a negative electrode current collector may be made of copper, stainless steel, aluminum, titanium, heat-treated carbon; copper and stainless steel wherein the surface is treated with carbon, nickel, titanium or silver; or an aluminum-cadmium alloy. As in the case of a positive electrode current collector, a negative electrode current collector may also increase the adhesive strength of a negative electrode active material due to tiny bumps formed on the surface of the current collector, and may have various shapes such as film, sheet, foil, net, porous material, foam, or felt.

In some embodiments, a separator is interposed between a positive electrode and a negative electrode prepared according to the procedure described above.

In some embodiments, the separator has a pore diameter from about 0.01 to about 10 μm, and a thickness from about 5 to about 300 μm. A non-limiting example of a separator material is an olefin polymer such as polypropylene or polyethylene; or a sheet or felt made of glass fiber. If a solid electrolyte such as a polymer is used as an electrolyte, the solid electrolyte may also serve as a separator.

In some embodiments, a lithium salt-containing non-aqueous electrolyte includes a non-aqueous electrolyte solution and lithium. A non-aqueous electrolyte may be a non-aqueous electrolyte solution, an organic solid electrolyte, or an inorganic solid electrolyte.

Non-limiting examples of the non-aqueous electrolyte solution include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxyethane, 2-methyl-tetrahydrofuran, dimethyl sulfoxide, 1,3-dioxolane, N,N-formamide, N,N-dimethyl formamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, propionate methyl, and propionate ethyl.

Non-limiting examples of the organic solid electrolyte include polyethylene derivatives, ethylene oxide derivatives, polypropylene oxide derivatives, phosphate ester polymer, polyester sulfide, polyvinyl alcohol, and polyvinylidene fluoride.

Non-limiting examples of the inorganic solid electrolyte include $Li_3N$, $LiI$, $Li_5Ni_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salts are the substances easily dissolved in the non-aqueous electrolyte, and non-limiting examples of the lithium salts include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium lower aliphatic carboxylate, lithium tetraphenyl borate, and imide.

FIG. 1 shows a schematic cross sectional diagram of a representative structure of a lithium secondary battery 30 according to one embodiment of the present invention.

As shown in FIG. 1, the lithium secondary battery 30 includes a positive electrode 23; a negative electrode 22; a separator 24 interposed between the positive electrode 23 and the negative electrode 22; an electrolyte (not shown) impregnated in the positive electrode 23, the negative electrode, and the separator 24; a battery container 25; and a cap assembly 26 sealing the battery case 25. The lithium battery 30 may be constructed by stacking the positive electrode 23, the negative electrode 22, and the separator 24 in order, and then coiling the stacked structure into a spiral and placing it into the battery case 25. The lithium secondary battery 30 is completed by sealing the battery case 25 with the cap assembly 26.

Hereinafter, the embodiments of the present invention are described in detail with reference to Examples, but the embodiments of the present invention are not limited thereto.

Example 1

0.22 mol of nickel sulfate, 0.12 mol of cobalt sulfate, and 0.66 mol of manganese sulfate were dissolved in water under an oxygen-free atmosphere to prepare a metal sulfate solution containing nickel, cobalt, and manganese.

A sodium hydroxide/ammonium hydroxide solution was added drop-wise to the metal sulfate solution containing nickel, cobalt, and manganese to obtain a mixture. Then, a coprecipitation reaction of the mixture was performed.

The mixture was purged with nitrogen, and a coprecipitate obtained by the coprecipitation reaction was washed and dried to obtain a composite precursor, $0.5Mn_3O_4$-$0.5Ni_{0.22}Co_{0.12}Mn_{0.66}(OH)_2$.

Example 2

1.0 mol of the composite precursor $0.5Mn_3O_4$-$0.5Ni_{0.22}Co_{0.12}Mn_{0.66}(OH)_2$ prepared according to Example 1, and 1.58 mol of lithium carbonate as a lithium compound were mixed, and water was added thereto and mixed.

The resulting mixture was heat-treated at about 800° C. in an oxidative gas atmosphere including 20 volume % of oxygen and 80 volume % of nitrogen to obtain a composite, $0.5Li_2MnO_3$-$0.5LiNi_{0.5}Co_{0.2}Mn_{0.3}O_2$.

Example 3

The same method as the method of Example 2 was performed, except that the content of lithium carbonate as a lithium compound was changed to 1.45 mol, to obtain a composite, $0.45Li_2MnO_3$-$0.55LiNi_{0.5}Co_{0.2}Mn_{0.3}O_2$.

Comparative Example 1

0.22 mol of nickel sulfate, 0.12 mol of cobalt sulfate, and 0.66 mol of manganese sulfate were dissolved in water under oxygen-free atmosphere to prepare a metal sulfate solution containing nickel, cobalt, and manganese. A 1 wt % of hydrazine solution was prepared and mixed with the metal sulfate solution to obtain a mixture.

A sodium hydroxide/ammonium hydroxide solution was added drop-wise to the mixture of the metal sulfate solution containing nickel, cobalt, and manganese and the hydrazine solution to obtain a mixture. Then, a coprecipitation reaction of the mixture was performed.

The mixture was purged with nitrogen, and a coprecipitate obtained by the coprecipitation reaction was washed and dried in a vacuum oven for 24 hours to obtain a composite precursor, $Ni_{0.22}Co_{0.12}Mn_{0.66}(OH)_2$.

Comparative Example 2

The same method as the method of Example 2 was performed, except that the metal oxide precursor obtained according to Comparative Example 1 was used instead of the composite precursor obtained according to Example 1, to obtain a composite, $Li_{1.33}Ni_{0.22}Co_{0.12}Mn_{0.66}(OH)_2$.

Comparative Example 3

The same method as the method of Comparative Example 2 was performed, except that the content of lithium carbonate as a lithium compound was changed to 1.45 mol, to obtain a composite.

Manufacturing Example 1

Preparation of Coin Half-Cell

The composite obtained according to Example 2 was used to prepare a 2032 type coin half-cell in the following method.

A mixture of 96 g of the composite obtained according to Example 2, 2 g of polyvinylidene fluoride, 47 g of N-methyl pyrrolidone as a solvent, and 2 g of carbon black as a conductive agent was treated with a mixer to remove bubbles therein to prepare a slurry for the formation of a uniformly dispersed positive electrode active material layer.

The slurry prepared in the procedure above was formed into a thin plate by coating the slurry on an aluminum laminate by using a doctor blade. The thin plate was dried at 135° C. for more than three hours, rolled and then vacuumed dried to obtain a positive electrode.

A lithium metal counter electrode was used as an opposite electrode of the positive electrode to obtain a 2032 type coin half-cell. A separator (thickness: about 16 μm) made of a porous polyethylene (PE) film was interposed between the positive electrode and the lithium metal counter electrode and an electrolyte solution was injected to prepare the 2032 type coin half-cell.

The electrolyte solution was a solution including a solvent prepared by mixing ethylene carbonate (EC) and ethyl methyl carbonate (EMC) at a volumetric ratio of 3:5 and 1.1M $LiPF_6$ dissolved in the solvent.

Manufacturing Example 2

Preparation of Coin Half-Cell

The same method as the method of Manufacturing Example 1 was performed to obtain a coin half cell, except that composite obtained according to Example 3 was used instead of the composite obtained according to Example 2.

Comparative Manufacturing Example 1:
Preparation of Coin Half-Cell

The same method as the method of Manufacturing Example 1 was performed to obtain a coin half cell, except that composite obtained according to Comparative Example 2 was used instead of the composite obtained according to Example 2.

Comparative Manufacturing Example 2:
Preparation of Coin Half-Cell

The same method as the method of Manufacturing Example 1 was performed to obtain a coin half cell, except that composite obtained according to Comparative Example 3 was used instead of the composite obtained according to Example 2, Evaluation Example 1: Analysis Using Scanning Electron Microscope 1) Composite Precursor According to Example 1 and Metal Oxide Precursor Prepared According to Comparative Example 1

Figure 2:
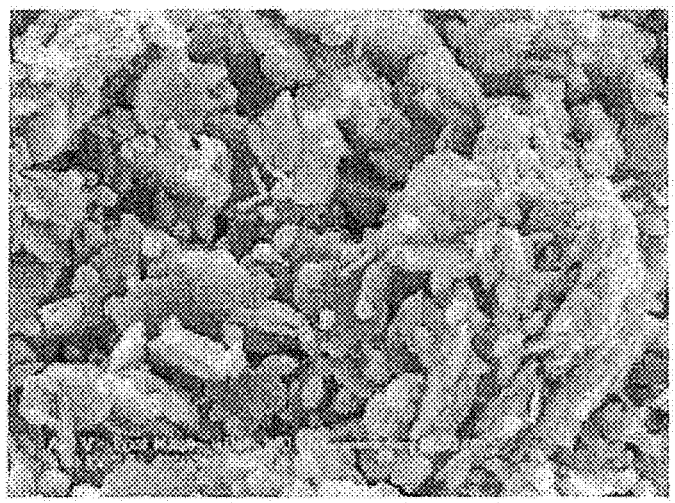
FIG. 2 shows a scanning electron microscope view of a composite precursor according to Example 1.
Figure 3:
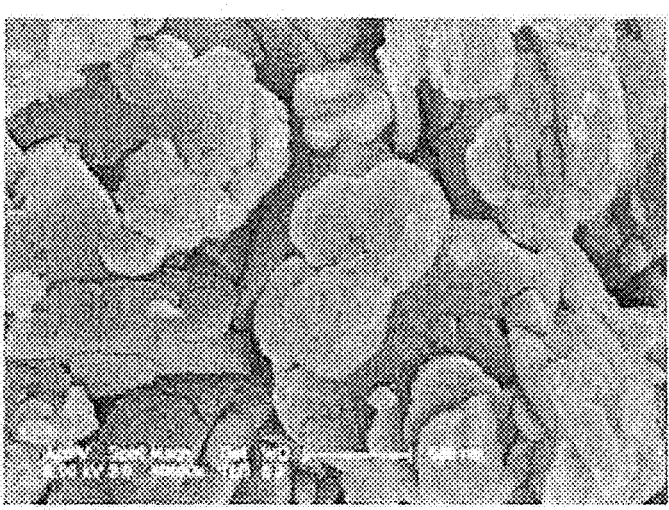
FIG. 3 shows an electron microscope view of a metal hydroxide according to Comparative Example 1.

The composite precursor according to Example 1 and the metal oxide precursor prepared according to Comparative Example 1 were analyzed by using a scanning electron microscope, and the results are shown in FIG. 2 and FIG. 3, respectively.

As shown in FIG. 2, the composite precursor according to Example 1 included materials of two phases, in contrast to the metal oxide precursor of Comparative Example 1 shown in FIG. 3.

2) the Composite Obtained According to Example 2 and the Metal Oxide According to Comparative Example 3

Figure 4:
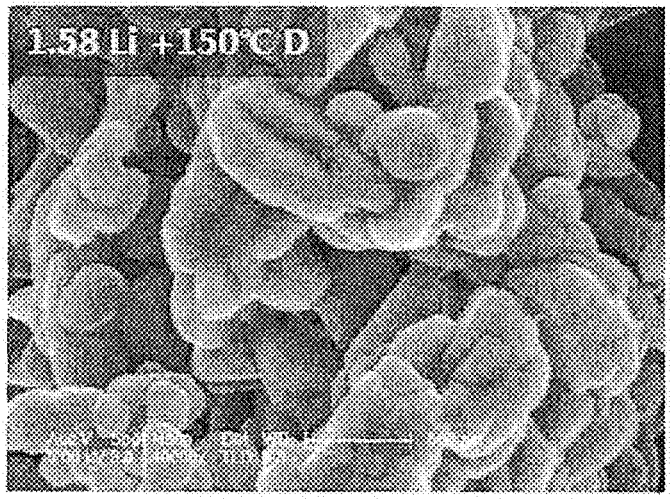
FIGS. 4 and 5 are photographs showing scanning electron microscope analysis results of a composite prepared according to Example 2 and a metal oxide prepared according to Comparative Example 3, respectively.
Figure 5:
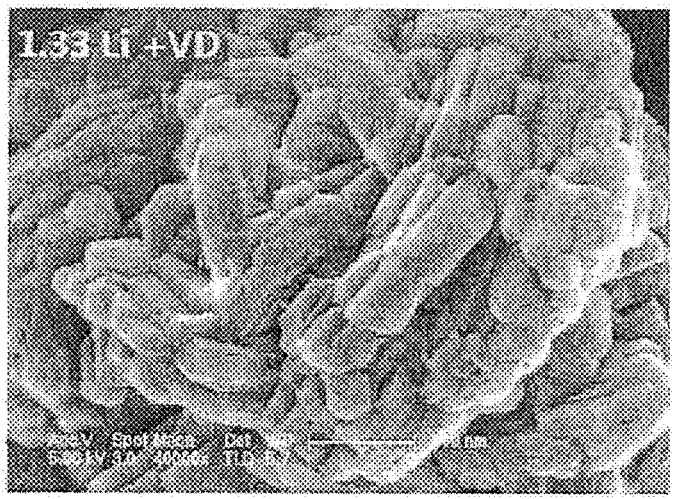

The composite obtained according to Example 2 and the metal oxide prepared according to Comparative Example 3 were analyzed by using a scanning electron microscope, and the results are shown in FIGS. 4 to 5, respectively. FIG. 4 shows an image of the composite of Example 2, and FIG. 5 shows an image of the metal oxide of Comparative Example 3.

As shown in FIG. 4, the composite obtained according to Example 2 had a round shape, and, as shown in FIG. 5, the composite obtained according to Comparative Example 3 had a plate-type particle shape.

According to the results described above, the optimum molar ratio of lithium and a metal was dependent on precursor structures.

Evaluation Example 2: X-Ray Diffraction Analysis

1) Composite Precursor and Metal Oxide Precursor

Figure 6:
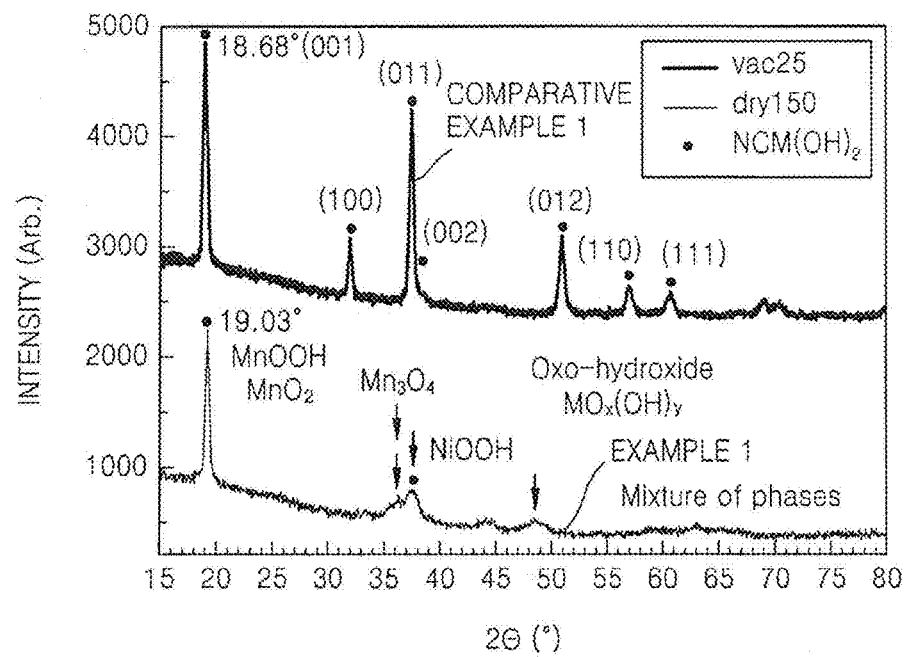
FIG. 6 shows an X-ray diffraction spectrum of a composite precursor of Example 1 and a metal hydroxide of Comparative Example 1.

The composite precursor according to Example 1 and the metal oxide precursor prepared according to Comparative Example 1 were analyzed by X-ray diffraction analysis and the result is shown in FIG. 6.

As shown in FIG. 6, the composite precursor of Example 1 showed a $Mn_3O_4$ peak at the 2θ of about 36°, indicating that the composite precursor had a composite phase, in contrast to the metal oxide precursor of Comparative Example 1.

2) Composite and Metal Oxide

Figure 7:
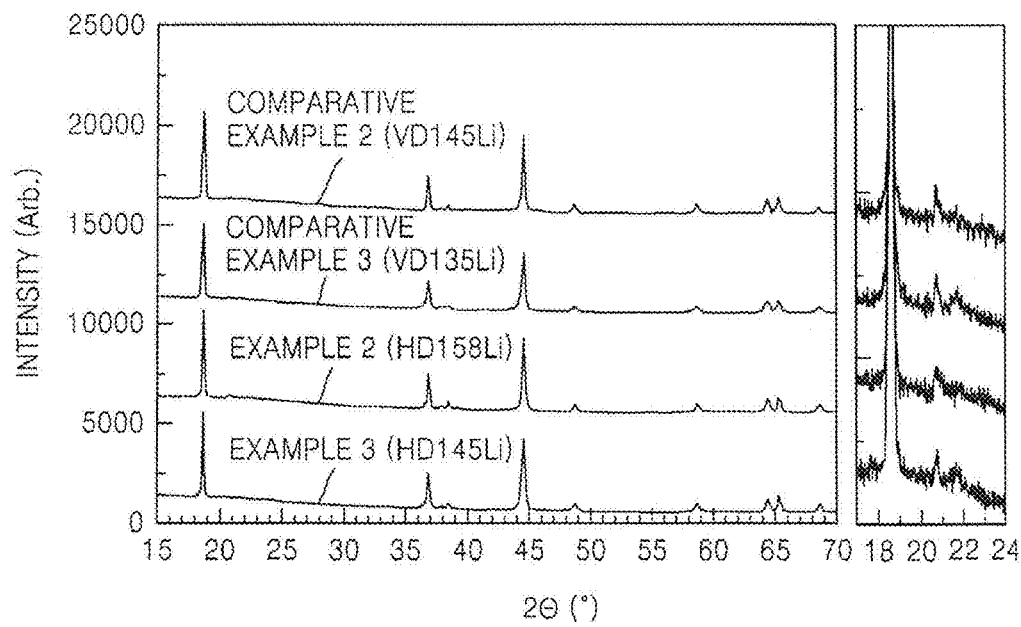
FIG. 7 shows an X-ray diffraction spectrum of a composite prepared according to Examples 2-3 and a metal hydroxide prepared according to Comparative Examples 2-3.

The composite obtained according to Examples 2-3 and the metal oxide prepared according to Comparative Examples 2-3 were analyzed by X-ray diffraction analysis and the result is shown in FIG. 7.

As shown in FIG. 7, the composite of Example 2 showed a $Li_2MnO_3$ peak at the 2θ of about 21°, which was a singlet peak. On the contrary, the peak of the metal oxide of Comparative Example 3 at the 2θ of about 21° was branched into two peaks. According to the data, $Li_2MnO_3$ was not formed in the metal oxide of Comparative Example 3.

Evaluation Example 3: Analysis Using Transmission Electron Microscope

The composite prepared according to Example 2 and the metal oxide prepared according to Comparative Example 3 were analyzed by using a transmission electron microscope.

The transmission electron microscope used was JEM-2100F (JEOL).

Figure 8:
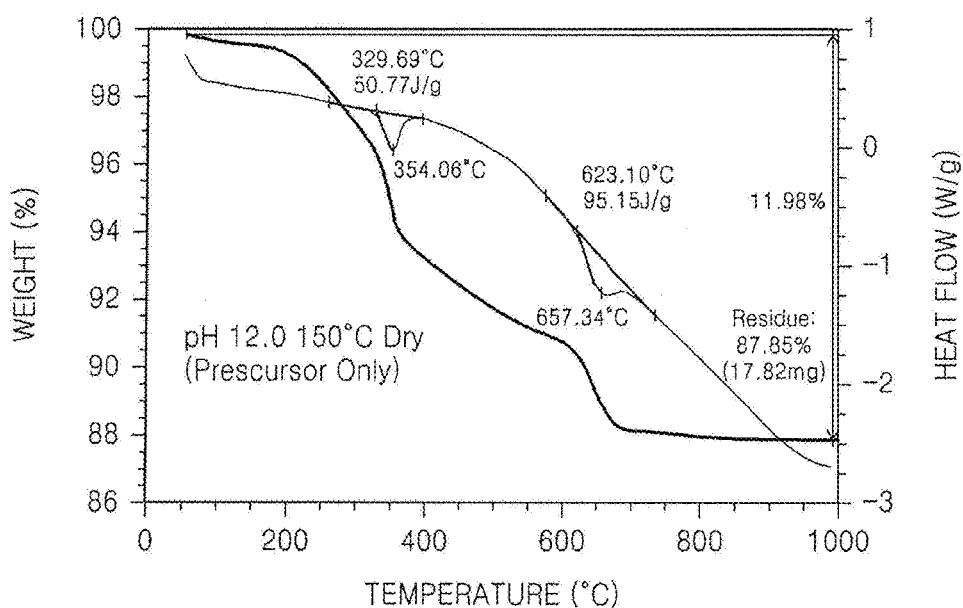
FIG. 8 shows a transmission electron microscope view of a composite according to Example 2.
Figure 9:
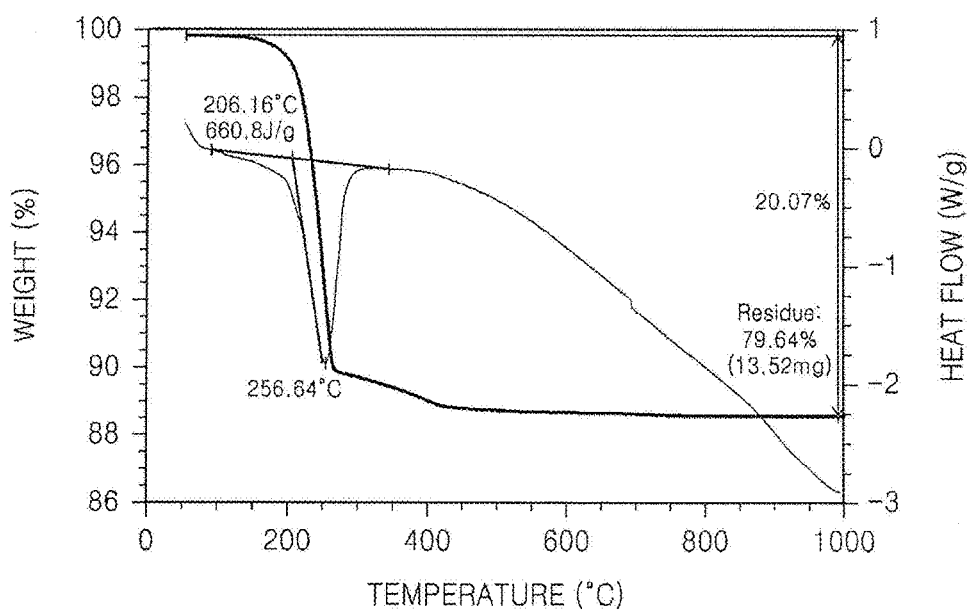
FIG. 9 shows a transmission electron microscope view of a metal oxide according to Comparative Example 3.

The transmission electron microscope analysis result of the composite prepared according to Example 2 is shown in FIG. 8, and the transmission electron microscope analysis result of the composite prepared according to Comparative Example 3 is shown in FIG. 9.

As shown in FIG. 9, in the shell region (a) as the internal region, and in the face region (b) as the edge region, the metal oxide of Comparative Example 3 showed different diffraction patterns. Manganese was mainly detected in the external region, and all the manganese, cobalt, and nickel components were detected in the internal region.

According to the oxidation number of manganese in Table 1 below, an assumption may be made that nickel, cobalt, and manganese exist in the shell region and $Li_2MnO_3$ exists in the edge region.

TABLE 1

| Item | (a) NCM | (b) $Li_2MnO_3$ |
|---|---|---|
| $L_3/L_2$ ratio | 2.14 | 2.03 |
| Mn oxidation state | $Mn^{3.5+}$ | $Mn^{4+}$ |

On the contrary, as shown in FIG. 8, the composite obtained according to Example 2 showed the same diffraction pattern in the internal region and in the edge region.

Evaluation Example 4: Thermal Analysis

The composite precursors prepared according to Example 1 and Comparative Example 1 were analyzed by thermal analysis and the results are shown in FIGS. 10a-10b and 11a-11b, respectively.

Figure 10A:
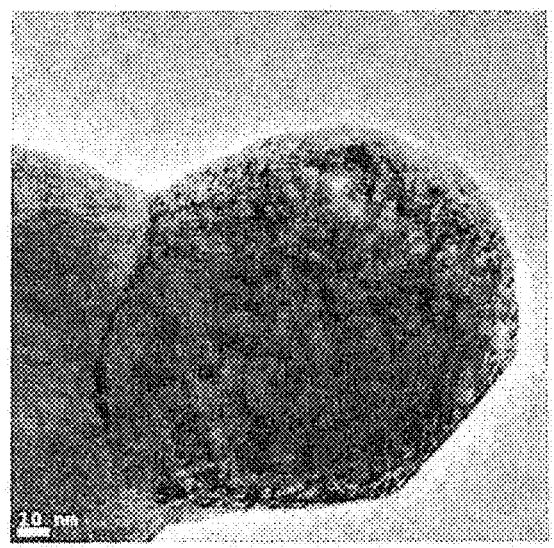
FIGS. 10*a*-10*b* and 11*a*-11*b* show thermal analysis graphs of composite precursors prepared according to Example 1 and Comparative Example 1, respectively.
Figure 10B:
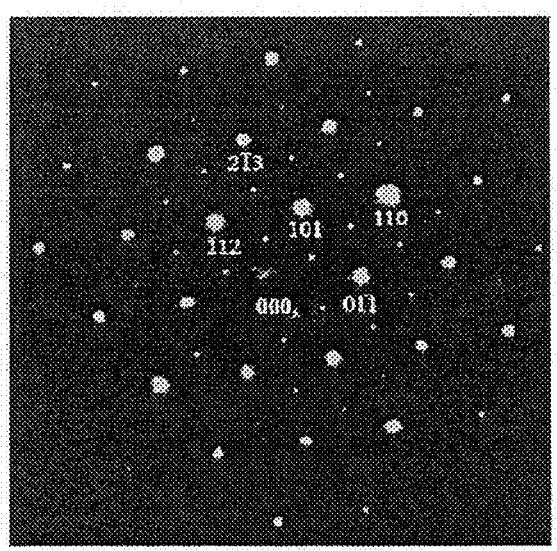

FIGS. 10a and 10b show that the structure is homogenous on the surface and in the internal region, respectively. In contrast, referring to FIG. 11a, the image shows that a nickel-cobalt-manganese phase was formed in the internal region. Referring to FIG. 11b, the image shows that a heterogeneous $Li_2MnO_3$ phase was formed in the edge region.

Figure 11A:
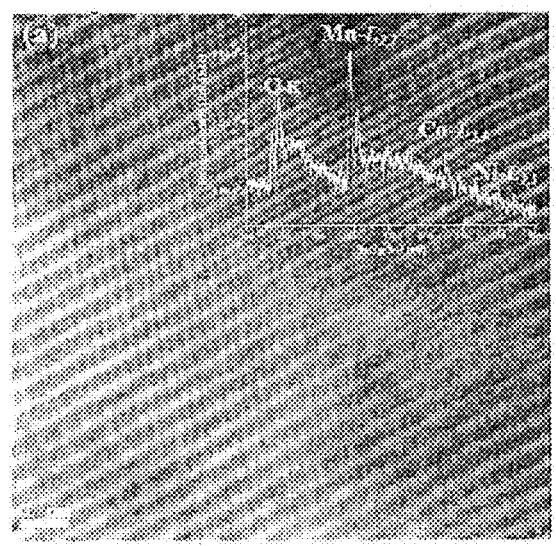
Figure 11B:
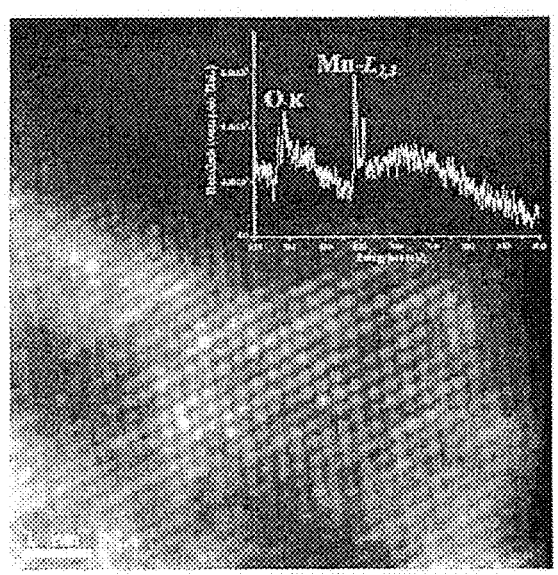

In the composite phase composite precursor in FIGS. 11a and 11b, in contrast to the single phase precursor in FIGS. 10a and 10b, a $Li_2MnO_3$ phase was formed relatively heterogeneous because of the high reactivity.

Evaluation Example 5: Charge and Discharge Experiment

In the coin-half cells prepared according to Manufacturing Example 1 and Comparative Manufacturing Example 1, the charge and discharge properties were evaluated by using a charge and discharge regulator (Manufacturer: TOYO, Model: TOYO-3100), and the result is shown in Table 2.

In the coin cells prepared according to the Manufacturing Example 1 and the Comparative Manufacturing Example 1, a formation was performed by charging and discharging one time at 0.1 C and then charging and discharging were performed one time at 0.2 C to verify the initial charging and discharging property. Then, charging and discharging were repeated at 1 C for 50 times to investigate cycle properties. The charging procedure was set to be started in a constant current mode, and then adjusted to a constant voltage mode so that the charging would be cut off at 0.01 C. The discharging procedure was set to be cut off in a constant current mode at 1.5 V.

(1) Initial Charge Efficiency (ICE)

ICE was measured according to Equation 1 below.

ICE [%]=[$1^{st}$ cycle discharge capacity/$1^{st}$ cycle charge capacity]×100    Equation 1

(2) Charge Capacity and Discharge Capacity

A charge capacity and a discharge capacity were measured in the first cycle.

As illustrated in Table 2, the coin cell prepared according to Manufacturing Example 1 showed higher charge and discharge capacity, as well as higher initial charge efficiency, than the coin cell prepared according to Comparative Manufacturing Example 1.

TABLE 2

| Item | Charge Capacity (mAh/g) | Discharge Capacity (mAh/g) | I.C.E (%) |
|---|---|---|---|
| Manufacturing Example 1 | 315 | 230 | 73.1 |
| Comparative Manufacturing Example 1 | 310 | 225 | 72.6 |

Evaluation Example 6: Cycle Life

In the coin half-cells prepared according to Manufacturing Example 1 and Comparative Manufacturing Example 1, a formation was performed by charging and discharging one time at 0.1 C and then charging and discharging were performed one time at 0.2 C to verify the initial charging and discharging property. Then, charging and discharging were repeated at 1 C for 50 times to investigate cycle properties. The charging procedure was set to be started in a constant current mode, and then adjusted to a constant voltage mode so that the charging would be cut off at 0.01 C. The discharging procedure was set to be cut off in a constant current mode at 1.5 V.

The charge capacity change after the coin half-cells underwent the charging and discharging cycle 10, 30, and 50 times was evaluated and the result is shown in Table 3.

The capacity maintenance ratio at the xth cycle is expressed by Equation 2 below, and the result is shown in Table 3 below.

Capacity maintenance ratio at xth cycle [%]=[Discharge capacity at the 50th cycle/Discharge capacity at the 1st cycle]×100    Equation 2

TABLE 3

| Item | Capacity Maintenance Rate at 10th cycle (%) | Capacity Maintenance Rate at 30th cycle (%) | Capacity Maintenance Rate at 50th cycle (%) |
|---|---|---|---|
| Manufacturing Example 1 | 100.2 | 100.5 | 99.1 |
| Comparative Manufacturing Example 1 | 98.1 | 95.5 | 93.4 |

As shown in Table 3, the cycle life property of the coin half-cell prepared according to Manufacturing Example 1 was better than that of the coin half-cell prepared according to Comparative Manufacturing Example 1.

As described above, according to the one or more of the above embodiments of the present invention, a composite wherein a $Li_2MnO_3$ phase is effectively formed may be prepared by using a composite precursor according to an embodiment of the present invention. A lithium secondary battery of which life property is improved may be prepared by using such composite.

While one or more embodiments of the present invention have been described with reference to the figures, it will be understood by those of ordinary skill in the art that various changes in form and details may be made therein without departing from the spirit and scope of the present invention as defined by the following claims and equivalents thereof.

| Reference Signs List | |
|---|---|
| 22: negative electrode | 23: positive electrode |
| 24: separator | 25: battery case |
| 30: lithium secondary battery | |

What is claimed is:

1. A composite precursor represented by Formula 1 below:

$aMn_3O_4$-$bM(OH)_2$    Formula 1 wherein, 0<a≤0.8, 0.2≤b<1
and M comprises nickel (Ni), manganese (Mn), and cobalt (Co).

2. The composite precursor of claim 1, wherein the composite precursor represented by Formula 1 is $0.5Mn_3O_4$-$0.5Ni_{0.22}Co_{0.12}Mn_{0.66}(OH)_2$, $0.5Mn_3O_4$-$0.5Ni_{0.22}Co_{0.12}Mn_{0.51}(OH)_2$, $0.05Mn_3O_4$-$0.95Ni_{0.26}Co_{0.14}Mn_{0.6}(OH)_2$, $0.05Mn_3O_4$-$0.85Ni_{0.26}Co_{0.14}Mn_{0.6}(OH)_2$, $0.05Mn_3O_4$-$0.95Ni_{0.29}Co_{0.12}Mn_{0.59}(OH)_2$, $0.05Mn_3O_4$-$0.85Ni_{0.29}Co_{0.12}Mn_{0.59}(OH)_2$, $0.05Mn_3O_4$-$0.95Ni_{0.23}Co_{0.24}Mn_{0.53}(OH)_2$, or $0.05Mn_3O_4$-$0.85Ni_{0.23}Co_{0.24}Mn_{0.536}(OH)_2$.

3. The composite precursor of claim 1, wherein a peak at $2\theta$ in a range of $35\pm0.5°$ is shown in an X-ray diffraction spectrum using Cu—K$\alpha$.

\* \* \* \* \*